United States Patent
Garelli et al.

(10) Patent No.: US 8,941,795 B2
(45) Date of Patent: Jan. 27, 2015

(54) ELECTRONIC DEVICE WITH BACKLIT DISPLAY

(75) Inventors: Adam T. Garelli, Santa Clara, CA (US); Jun Qi, Cupertino, CA (US); Victor H. Yin, Cupertino, CA (US); Thomas W. Wilson, Jr., Saratoga, CA (US); Dinesh C. Mathew, Fremont, CA (US); Bryan W. Posner, La Selva Beach, CA (US); Keith J. Hendren, Capitola, CA (US); Peteris K. Augenbergs, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 13/332,228

(22) Filed: Dec. 20, 2011

(65) Prior Publication Data

US 2013/0155351 A1   Jun. 20, 2013

(51) Int. Cl.
*G02F 1/1335* (2006.01)

(52) U.S. Cl.
USPC .......................................... 349/61

(58) Field of Classification Search
USPC .......................................... 349/61
See application file for complete search history.

(56) References Cited

U.S. PATENT DOCUMENTS

| | | | |
|---|---|---|---|
| 4,568,149 A * | 2/1986 | Sugata et al. | 349/111 |
| 6,524,665 B2 | 2/2003 | Sahouani et al. | |
| 6,665,038 B2 * | 12/2003 | Endo | 349/149 |
| 6,846,089 B2 | 1/2005 | Stevenson et al. | |
| 6,853,415 B2 | 2/2005 | Kim | |
| 7,223,005 B2 * | 5/2007 | Lamb et al. | 362/615 |
| 7,339,635 B2 | 3/2008 | Freking et al. | |
| 8,264,657 B2 | 9/2012 | Hashimoto | |
| 2008/0232135 A1 | 9/2008 | Kinder et al. | |
| 2009/0141210 A1 * | 6/2009 | Cho et al. | 349/64 |
| 2009/0161038 A1 * | 6/2009 | Toyama et al. | 349/62 |
| 2009/0322985 A1 | 12/2009 | Mizuuchi | |
| 2010/0165237 A1 | 7/2010 | Jung | |
| 2010/0238380 A1 * | 9/2010 | Kim | 349/67 |
| 2011/0075078 A1 * | 3/2011 | Cho et al. | 349/108 |
| 2011/0134365 A1 * | 6/2011 | Kim | 349/64 |
| 2011/0141393 A1 * | 6/2011 | Han et al. | 349/62 |
| 2011/0141396 A1 | 6/2011 | Nakamura et al. | |
| 2011/0164203 A1 * | 7/2011 | Kimura | 349/62 |
| 2011/0194305 A1 | 8/2011 | Chen et al. | |
| 2011/0292316 A1 * | 12/2011 | Fujimoto et al. | 349/58 |
| 2012/0140143 A1 | 6/2012 | Wurzel | |

OTHER PUBLICATIONS

Benson et al., U.S. Appl. No. 13/629,440, filed Sep. 27, 2012.

* cited by examiner

*Primary Examiner* — Timothy L Rude
(74) *Attorney, Agent, or Firm* — Treyz Law Group; G. Victor Treyz; Kendall P. Woodruff

(57) ABSTRACT

An electronic device may have a liquid crystal display with backlight structures. The backlight structures may produce backlight that passes through display layers in the display. The display layers may include color filter elements, a liquid crystal layer, and a thin-film transistor layer. The color filter elements may be interposed between the thin-film transistor layer and the backlight structures or the thin-film transistor layer may be interposed between the color filter elements and the backlight structures. The backlight structures may be formed from optical fiber, a two-dimensional array of light-emitting diodes, a light guide plate that includes a rectangular recess for receiving optical films, or light guide plate structures that include internal light scattering structures. A light guide plate may be provided with alignment features that mate with alignment features on optical films.

13 Claims, 23 Drawing Sheets

ELECTRONIC DEVICE WITH BACKLIT DISPLAY

BACKGROUND

This relates generally to electronic devices and, more particularly, to electronic devices with displays and associated backlight structures.

Electronic devices such as computers and cellular telephones may have displays. Some displays such as plasma displays and light-emitting diode displays have arrays of display pixels that generate light. In displays of this type, backlighting is not necessary, because the display pixels themselves are illuminated. Other displays, such as liquid crystal displays, contain passive display pixels. The pixels in a liquid crystal display can alter the amount of light that is transmitted through the display to display information for a user, but do not produce light. As a result, it is often desirable to provide backlight for a liquid crystal display.

In a typical backlight structure for a display such as a liquid crystal display, a light guide plate is used to distribute backlight generated by a light source such as a light-emitting diode light source. Optical films such as a diffuser layer and brightness enhancing film may be placed on top of the light guide plate. A reflector may be formed under the light guide plate to improve backlight efficiency.

Conventional backlight arrangements are often not as compact as desired. The inclusion of optical films, provisions for registering the positions of the optical films within a device, the size and shape of the conventional light guide plates and light source, and other conventional backlight design features raise challenges when attempting to make backlights less bulky and more efficient.

It would therefore be desirable to be able to provide electronic devices with improved displays and backlights.

SUMMARY

An electronic device may have a display such as a liquid crystal display with backlight structures. The backlight structures may produce backlight that passes through layers in the display.

The display may include color filter elements and a thin-film transistor layer. The color filter elements may be interposed between the thin-film transistor layer and the backlight structures or the thin-film transistor layer may be interposed between the color filter elements and the backlight structures.

The backlight structures may be formed from optical fiber that is illuminated by a light source such as a light-emitting diode. The surface of the optical fiber may be provided with light leakage promotion features such as a surface texture that facilitates light leakage from within the optical fiber.

If desired, the backlight structures may be formed from a two-dimensional light source such as a two-dimensional array of light-emitting diodes. The two-dimensional array of light-emitting diodes may be formed from vertically mounted light-emitting diodes on a substrate or may be formed from a layer of organic light-emitting diodes.

Backlight structures may be provided with a light guide plate that includes a rectangular recess for receiving optical films. Backlight may be generated by launching light from a light source into the light guide plate.

The light guide plate may include bubbles or other internal light scattering structures to help diffuse the backlight.

A light guide plate in a backlight may be provided with alignment features that mate with alignment features on optical films.

Further features of the invention, its nature and various advantages will be more apparent from the accompanying drawings and the following detailed description of the preferred embodiments.

DETAILED DESCRIPTION

A display may be provided with backlight structures. The backlight structures may produce backlight for the display that helps a user of a device view images on the display in a variety of ambient lighting conditions. Displays with backlights may be provided in any suitable type of electronic equipment.

Figure 1:
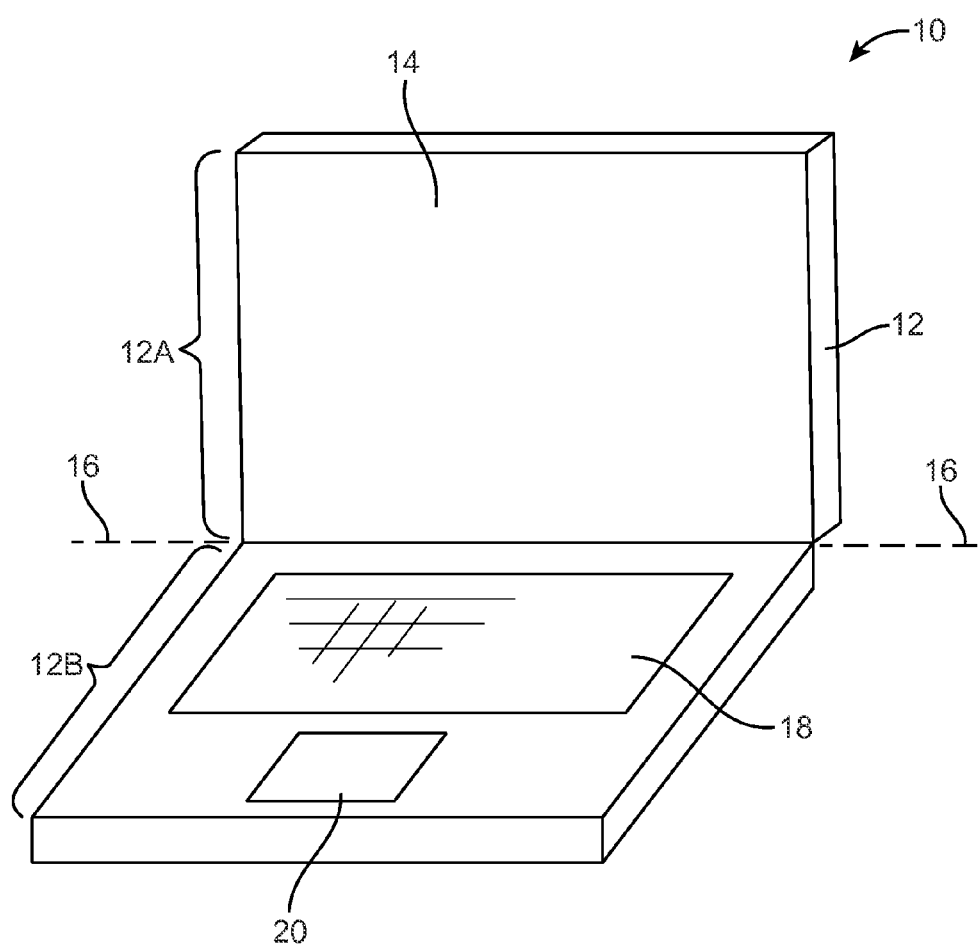
FIG. 1 is a diagram of an illustrative electronic device with a display such as a portable computer in accordance with an embodiment of the present invention.

An illustrative electronic device of the type that may be provided with a backlit display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a backlit display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Figure 2:
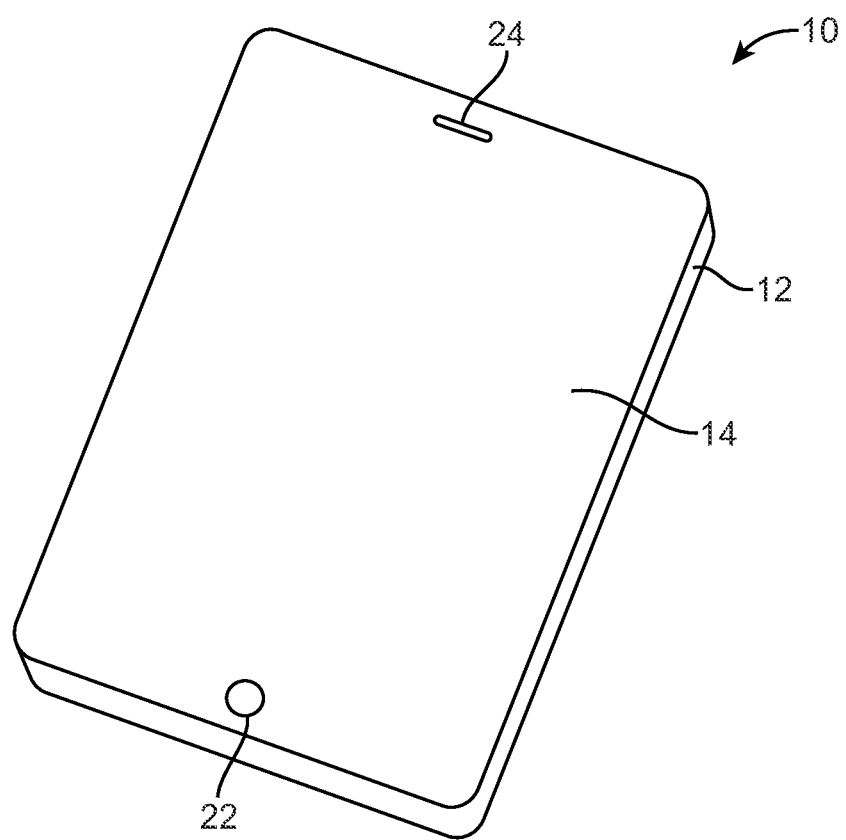
FIG. 2 is a diagram of an illustrative electronic device with a display such as a cellular telephone or other handheld device in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a backlit display such as display 14 mounted on the front of housing 12. Display 14 may be substantially filled with active display pixels or may have an inactive portion and an inactive portion. Display 14 may have openings (e.g., openings in the inactive or active portions of display 14) such as an opening to accommodate button 22 and an opening to accommodate speaker port 24.

Figure 3:
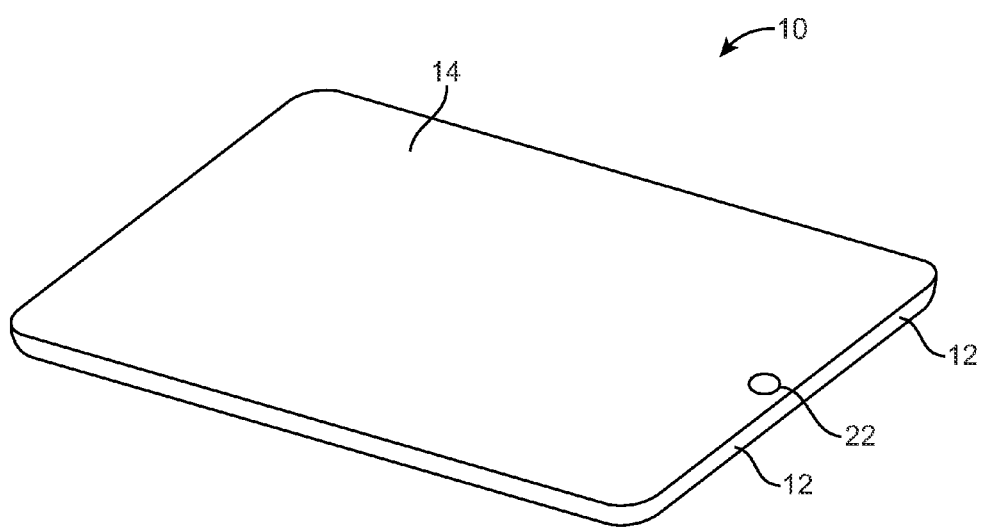
FIG. 3 is a diagram of an illustrative electronic device with a display such as a tablet computer in accordance with an embodiment of the present invention.

FIG. 3 is a perspective view of electronic device 10 in a configuration in which electronic device 10 has been implemented in the form of a tablet computer. As shown in FIG. 3, backlit display 14 may be mounted on the upper (front) surface of housing 12. An opening may be formed in display 14 to accommodate button 22.

Figure 4:
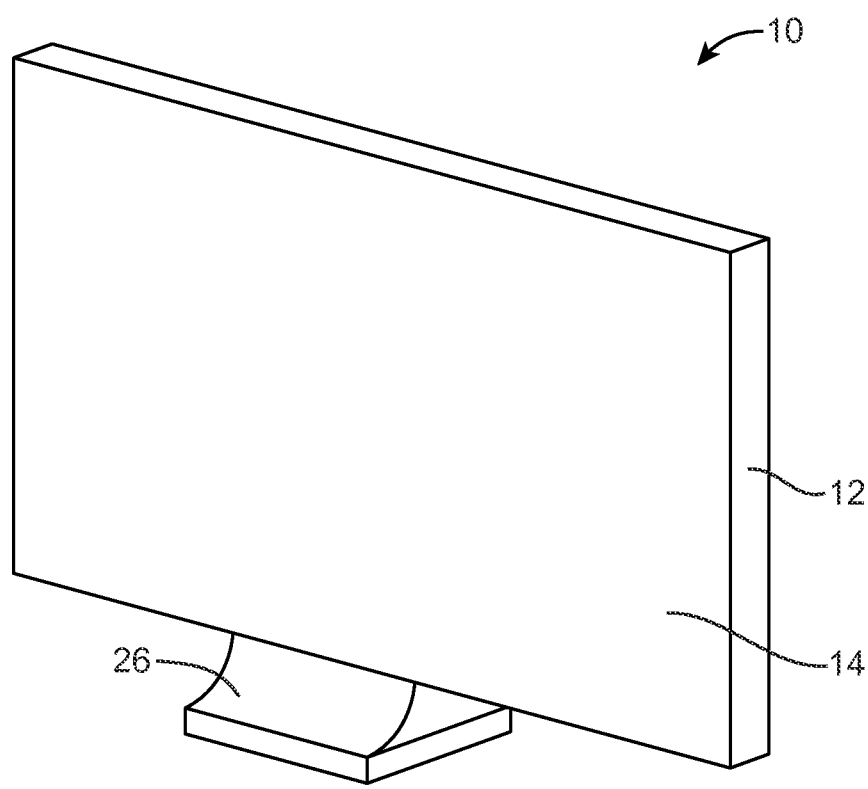
FIG. 4 is a diagram of an illustrative electronic device with a display such as a computer monitor with a built-in computer in accordance with an embodiment of the present invention.

FIG. 4 is a perspective view of electronic device 10 in a configuration in which electronic device 10 has been implemented in the form of a computer integrated into a computer monitor. As shown in FIG. 4, backlit display 14 may be mounted on the front surface of housing 12. Stand 26 may be used to support housing 12.

Figure 5:
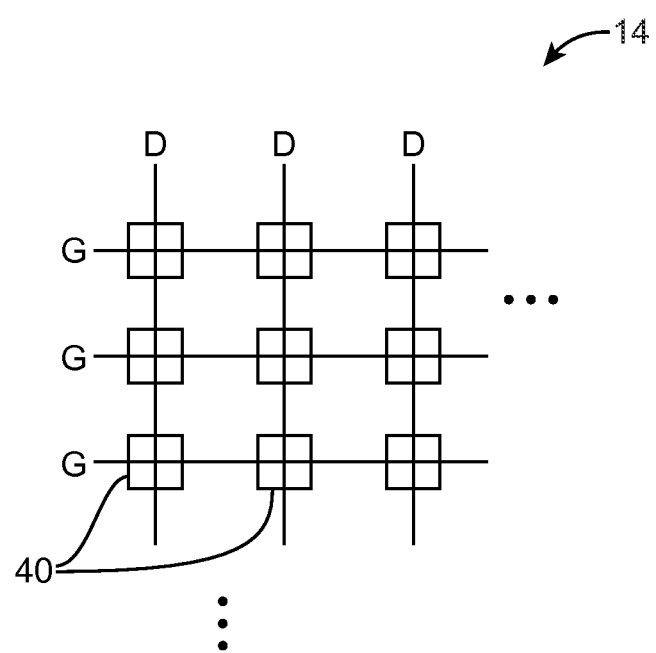
FIG. 5 is a circuit diagram showing circuitry that may be used in an array of display pixels in accordance with an embodiment of the present invention.

Display 14 may include an array of display pixels. Each display pixel may be used to control the light intensity associated with a portion of the display. An illustrative array of display pixels is shown in FIG. 5. As shown in FIG. 5, display 14 may have a pixel array with rows and columns of pixels 40. There may be tens, hundreds, or thousands of rows and columns of display pixels 40. Display driver circuitry such as a display driver integrated circuit and, if desired, associated thin-film transistor circuitry formed on a display substrate layer may be used to produce data signals D on data lines in display 14 and may produce gate line signals G on gate lines in display 14. During operation, the display driver circuitry may control the values of D and G to control the light intensity associated with each of the display pixels and thereby display images on display 14.

Figure 6:
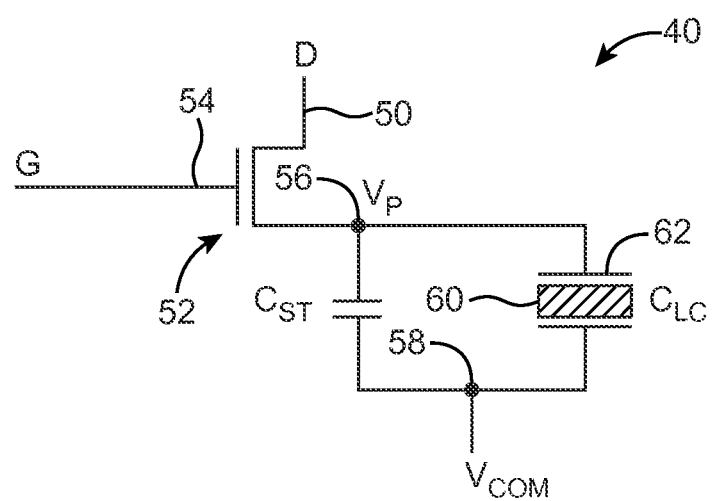
FIG. 6 is a circuit diagram of an illustrative display pixel in accordance with an embodiment of the present invention.

FIG. 6 is a circuit diagram of an illustrative display pixel in the pixel array of display 14. Pixels such as pixel 40 of FIG. 6 may be located at the intersection of each gate line and data line in display 14.

A data signal D may be supplied to terminal 50 from one of the data lines in display 14. Thin-film transistor 52 (e.g., a thin-film polysilicon transistor or an amorphous silicon transistor) may have a gate terminal such as gate 54 that receives gate line signal G from display driver circuitry (e.g., gate driver circuitry). When signal G is asserted, transistor 52 will be turned on and signal D will be passed to node 56 as voltage Vp. Data for display 14 may be displayed in frames. Following assertion of signal G in one frame, signal G may be deasserted. Signal G may then be asserted to turn on transistor 52 and capture a new value of Vp in a subsequent display frame.

Pixel 40 may have a signal storage element such as capacitor Cst or other charge storage element. Storage capacitor Cst may be used to store signal Vp between frames (i.e., in the period of time between the assertion of successive signals G).

Display 14 may have a common electrode coupled to node 58. The common electrode (which is sometimes referred to as the Vcom electrode) may be used to distribute a common electrode voltage such as common electrode voltage Vcom to nodes such as node 58 in each pixel 40 of array 24. Capacitor Cst may be coupled between nodes 56 and 58. A parallel capacitance Clc arises across nodes 56 and 58 due to electrode structures in pixel 40 that are used in controlling the electric field through the liquid crystal material of the pixel (liquid crystal material 60). As shown in FIG. 6, electrode structures 62 may be coupled to node 56. Capacitance Clc is associated with the capacitance between electrode structures 62 and common electrode Vcom at node 58. During operation, electrode structures 62 may be used to apply a controlled electric field (i.e., a field having a magnitude proportional to Vp-Vcom) across a pixel-sized portion of liquid crystal material 60 in pixel 40. Due to the presence of storage capacitor Cst, the value of Vp (and therefore the associated electric field across liquid crystal material 60) may be maintained across nodes 56 and 58 for the duration of the frame. Electrode structures 62 may have any suitable shape. For example, each display pixel may have an electrode that is formed from multiple electrode fingers.

The electric field that is produced across liquid crystal material 60 causes a change in the orientations of the liquid crystals in liquid crystal material 60. This changes the polarization of light passing through liquid crystal material 60. The change in polarization may be used in controlling the amount of light that is transmitted through each pixel 40 in display 14.

To provide display 14 with the ability to display color images, display 14 may be provided with color filter elements. For example, display 14 may be provided with color filter elements such as red, green, and blue elements. Each color filter element may be used to impart color to the light associated with a respective display pixel in display 14.

Figure 7:
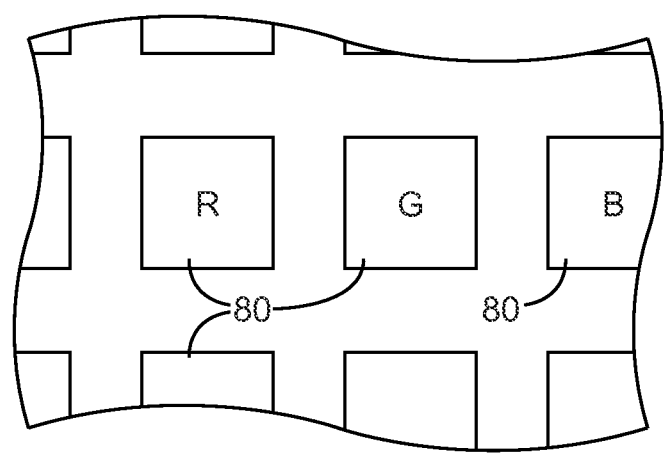
FIG. 7 is a diagram of a portion of an illustrative array of color filter elements of the type that may be used for providing a display with the ability to display color images in accordance with an embodiment of the present invention.

As shown in FIG. 7, color filter elements 80 may be formed in an array (e.g., an array of alternating red, green, and blue color filter elements) and may therefore sometimes be referred to as a color filter array 80 or color filter array structures 80. The illustrative color filter array of FIG. 7 shows how color filter elements may be arranged in rows and columns (e.g., rows and columns corresponding to respective rows and columns of display pixels 40 of FIG. 6).

The color filter array for display 14 may be formed using structures that are located above or that are located below thin-film transistor structures in display 14. An illustrative configuration for display 14 in which liquid crystal layer 60 is interposed between an upper (outer) color filter layer and a lower (inner) thin-film transistor layer is shown in FIG. 8.

Figure 8:
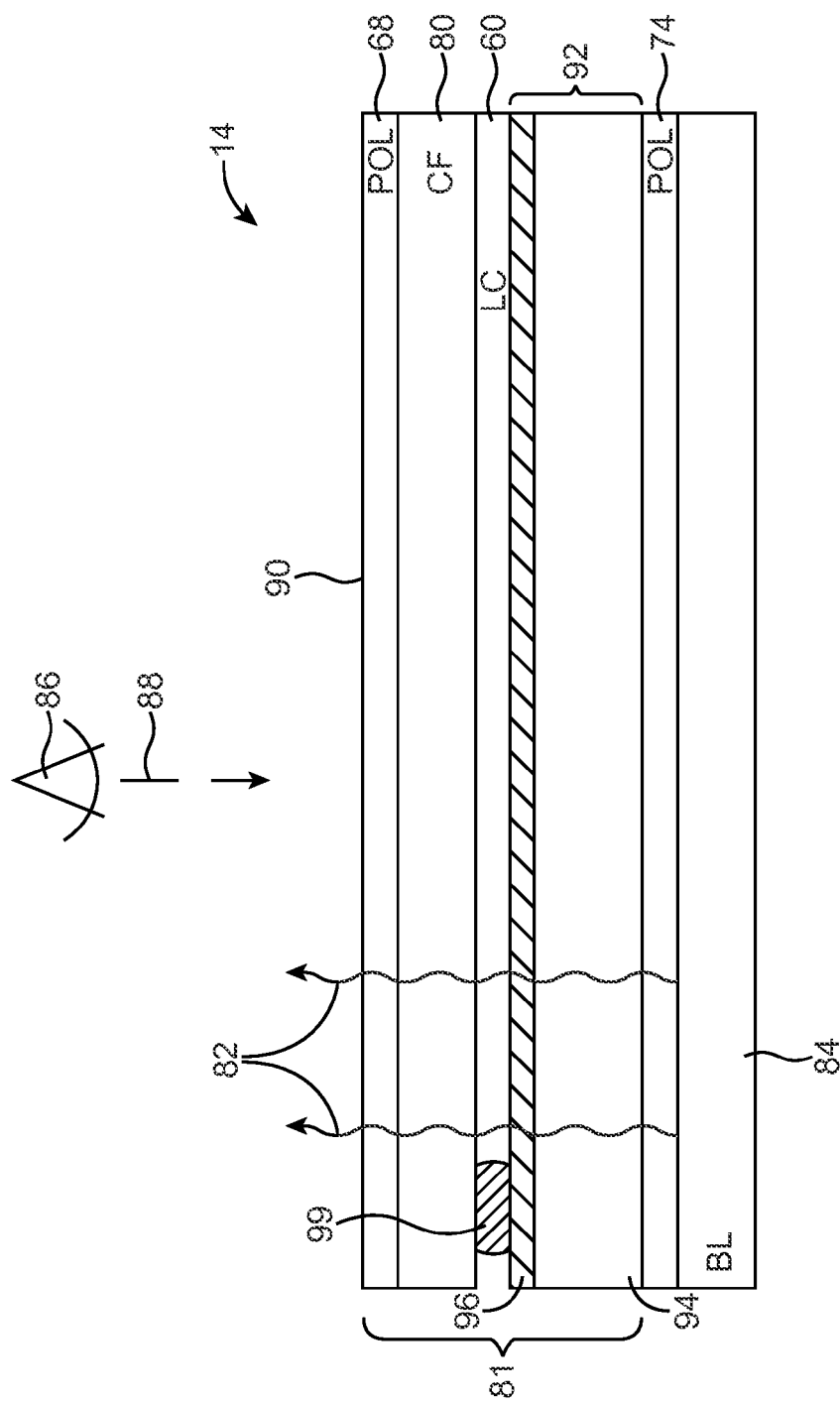
FIG. 8 is a cross-sectional view of an illustrative liquid crystal display having liquid crystal material interposed between an outer color filter array layer and an inner thin-film transistor layer in accordance with an embodiment of the present invention.

With an arrangement of the type shown in FIG. 8, display 14 may receive backlight 82 from backlight structures 84. Backlight structures 84 (which may sometimes be referred to as a backlight or backlight unit) may be located on the inner (lower) surface of display 14. Backlight 82 from backlight structures 84 passes through layers 81 of display 14 and exits upper (outer) display surface 90. A user of electronic device 10 such as viewer 86 may observe images on display 14 by looking in direction 88.

Display layers 81 may include an upper polarizer layer such as layer 68 and a lower polarizer layer such as layer 74. In a configuration of the type shown in FIG. 8, upper polarizer layer 68 may be attached to color filter array layer 70. Color filter array layer 80 may be formed from a sheet of glass or plastic or other material that includes an array of color filter elements. Display 14 may be covered with a layer of glass or plastic (i.e., a display cover layer) or a layer such as color filter layer 80 may be provided with sufficient thickness (and therefore strength) to serve as the outermost structural layer of display 14.

Lower polarizer layer 74 may be located between backlight 84 and thin-film transistor layer 92. Thin-film transistor layer 92 may include a substrate such as substrate 94. Substrate 94 may be formed from a layer of transparent material such as a sheet of clear glass or plastic. Thin-film transistor structures 96 may be formed on the surface of substrate 94 facing liquid crystal layer 60. Thin-film transistor structures 96 may include thin-film circuitry such as thin-film transistors in gate driver circuitry and thin-film display pixel transistors such as transistor 52 of FIG. 6, electrode structures such as electrode 62 of FIG. 6, gate line conductors, data line conductors, and other thin-film circuitry for controlling display pixels 40.

Display layers 81 may, if desired, include additional layers of material such as patterned opaque masking layers, smudge-resistance layers, anti-scratch layers, antireflection coatings, etc.

Liquid crystal layer 60 may be interposed between color filter layer 80 and thin-film transistor layer 92. Sealant 99 (e.g., epoxy) may be provided around the periphery of display 14 to help contain liquid crystal layer 60. As backlight 82 from backlight structures 84 passes through lower polarizer 74, lower polarizer 74 polarizes light 82. As polarized light 82 passes through liquid crystal material 60, liquid crystal material 60 may rotate the polarization of light 82 by an amount that is proportional to the electric field through liquid crystal material 60. If the polarization of light 82 is aligned in parallel with the polarization of polarizer 68, the transmission of light 82 through layer 68 will be maximized. If the polarization of light 82 is aligned so as to run perpendicular to the polarization of polarizer 68, the transmission of light 82 through layer 68 will be minimized (i.e., light 82 will be blocked). Display control circuitry may be used in adjusting the voltages Vp across the electrodes 62 of display pixels 40 in display 14, thereby selectively lightening and darkening pixels 40 and presenting an image to a user of device 10 such as viewer 86, viewing display 14 in direction 88.

Displays such as display 14 may be mounted on one or more surfaces of device 10. For example, displays such as display 14 may be mounted on a front face of housing 12, on a rear face of housing 12, or on other portions of device 10.

If desired, the color filter array in display 14 may be located between the thin-film transistor layer and backlight structures 84. Displays with layers that are stacked in this way may sometimes be referred to as having an inverted or flipped configuration, because the thin-film transistor layer is located above the color filter layer.

Figure 9:
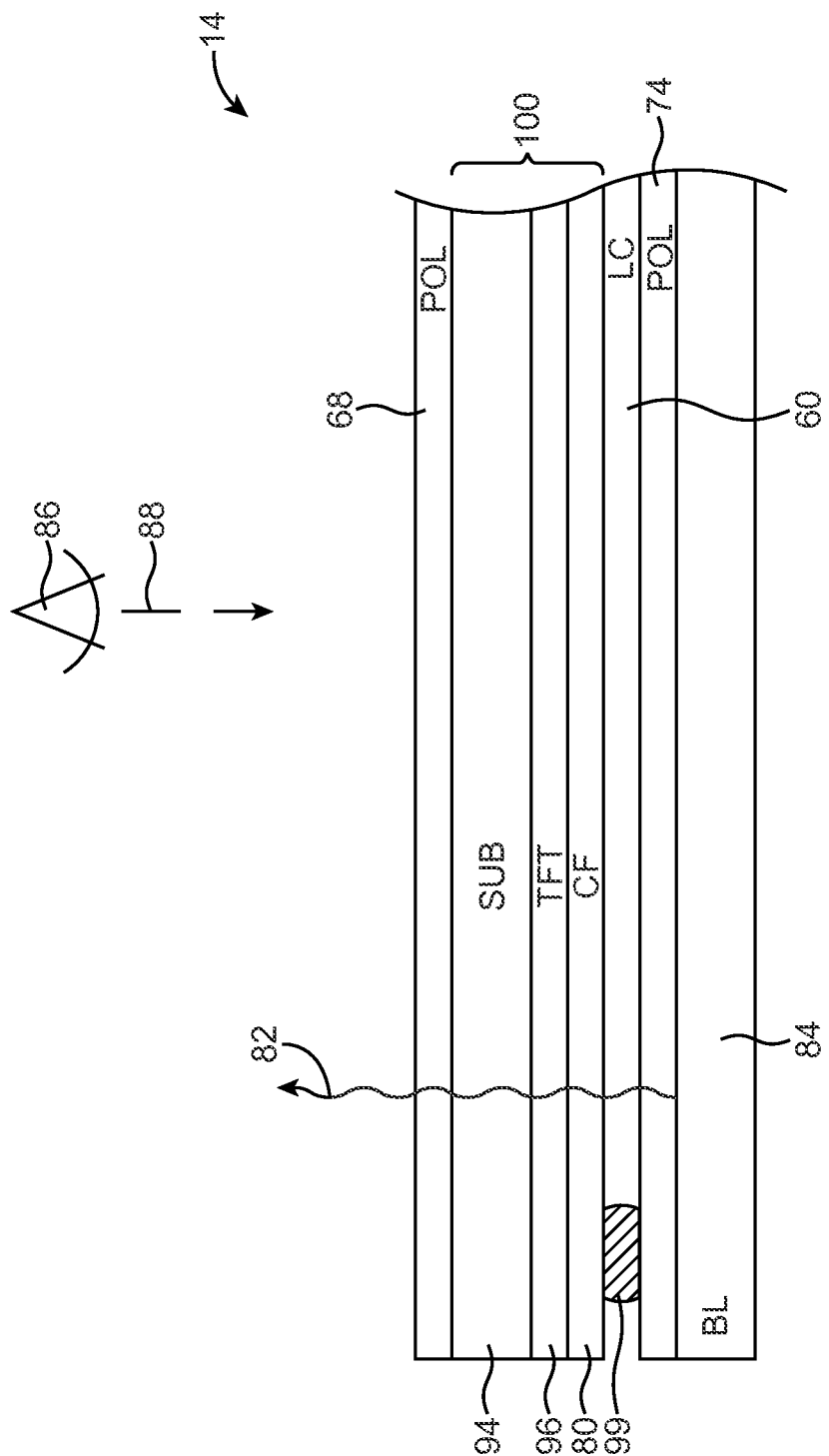
FIG. 9 is a cross-sectional view of an illustrative liquid crystal display having an outer display layer that includes thin-film transistors and color filter elements in accordance with an embodiment of the present invention.

With one suitable inverted display arrangement, which is shown in FIG. 9, color filter elements 80 may be formed in a layer on the same substrate (substrate 94) as thin-film transistor structures 96. Substrate 94 may be formed from a clear sheet of plastic or glass or other suitable transparent substrate materials. Thin-film transistor structures 96 may be formed on the inner (lower) surface of substrate 94 (e.g., using semiconductor processing techniques such as photolithography). Color filter elements 80 (e.g., a color filter array layer) may be formed on the deposited layer of thin-film transistor structures (e.g., on the inner surface of substrate 96). Color filter elements 80 include colored materials such as colored pigments or dyes and may be deposited using physical vapor deposition, chemical vapor deposition, ink-jet printing, spraying, pad printing, screen printing, spin-on coating, or other deposition techniques. The outer surface of the resulting thin-film transistor and color filter layer (i.e., display layer 100 of FIG. 9) may be covered with additional layers such as polarizer 68.

Liquid crystal layer 60 may be interposed between layer 100 and lower polarizer 74. Lower polarizer 74 may be formed from a polymer sheet. To provide a rigid support for lower polarizer layer 74, lower polarizer layer 74 may, if desired, be mounted to a clear glass substrate and/or other support structures such as a supporting layer of material associated with backlight structures 84.

Figure 10:
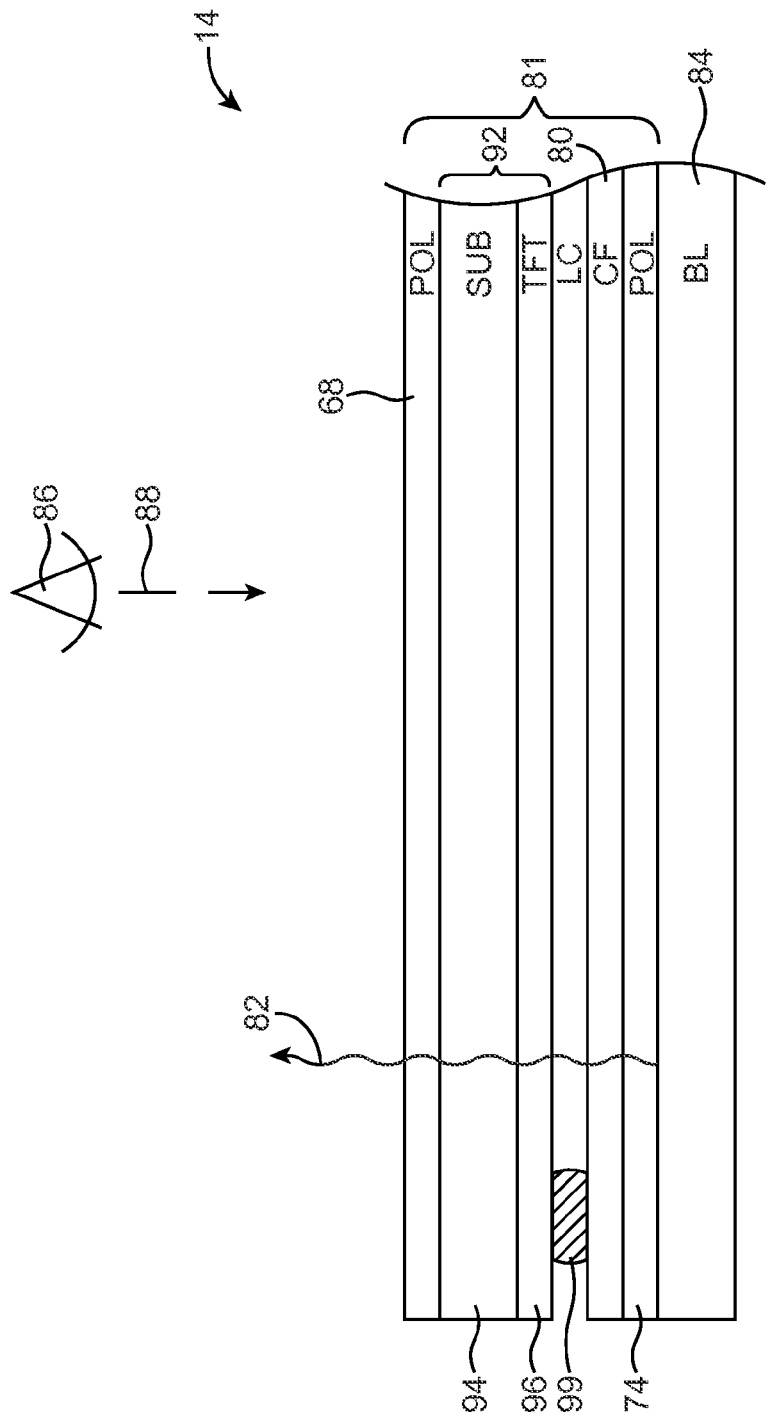
FIG. 10 is a cross-sectional view of an illustrative liquid crystal display having a liquid crystal layer interposed between an outer thin-film transistor layer and an inner color filter layer in accordance with an embodiment of the present invention.

Another suitable inverted display arrangement that may be used for display 14 is shown in FIG. 10. As in the configuration of FIG. 9, the color filter elements of FIG. 10 are located between the thin-film transistor layer and the backlight. In the configuration of FIG. 10, however, color filter layer 80 of FIG. 10 has been implemented using a substrate layer (e.g., a glass or plastic layer or other substrate) that is separate from thin-film transistor substrate layer 96. In this configuration, liquid crystal material 60 may be interposed between thin-film transistor layer 92 (e.g., thin-film transistor substrate layer 94 and thin-film transistor structures 96) and color filter array layer 80. As with display 14 of FIG. 9, display 14 of FIG. 10 may be provided with backlight 82 using backlight structures 84.

In configurations of the types shown in FIGS. 9 and 10, the outermost substrate layer in display 14 may be formed from the thin-film transistor layer (i.e., thin-film transistor substrate 94). Layer 94 may be implemented using a material that is thick enough (and therefore sufficiently strong) to allow layer 94 to be used in place of a separate cover glass layer. This may help reduce the size and weight of display 14. If desired, a cover layer of glass or plastic may be used to cover the outer layer of display 14.

As shown in FIGS. 8, 9, and 10, backlight 82 may travel vertically upwards (outwards) in through display layers 81 of display 14 to be viewed by a user such as viewer 86 looking at display 14 in direction 88. Backlight 82 may be generated using any suitable type of backlight structure. For example, a clear sheet of glass or a clear sheet of plastic such as acrylic or other transparent member may be used to form a substantially planar light guide structure. This type of planar light guide structure may sometimes be referred to as a light guide plate.

A light-emitting diode array or other light source may be used to emit light into an edge of the light guide plate. The light guide plate in this type of backlight unit may guide light internally in accordance with the principle of total internal reflection. Light that leaks outwards from the light guide plate towards viewer 86 may serve as backlight 82. A reflector in the backlight such as a sheet of white plastic or a layer of metal may be used to reflect light that leaks inwards from the light guide plate back in the outwards direction to serve as additional backlight 82.

If desired, other types of backlight structures may be used in implementing backlight structures 84 for displays such as displays 14 of FIGS. 8, 9, and 10.

Figure 11:
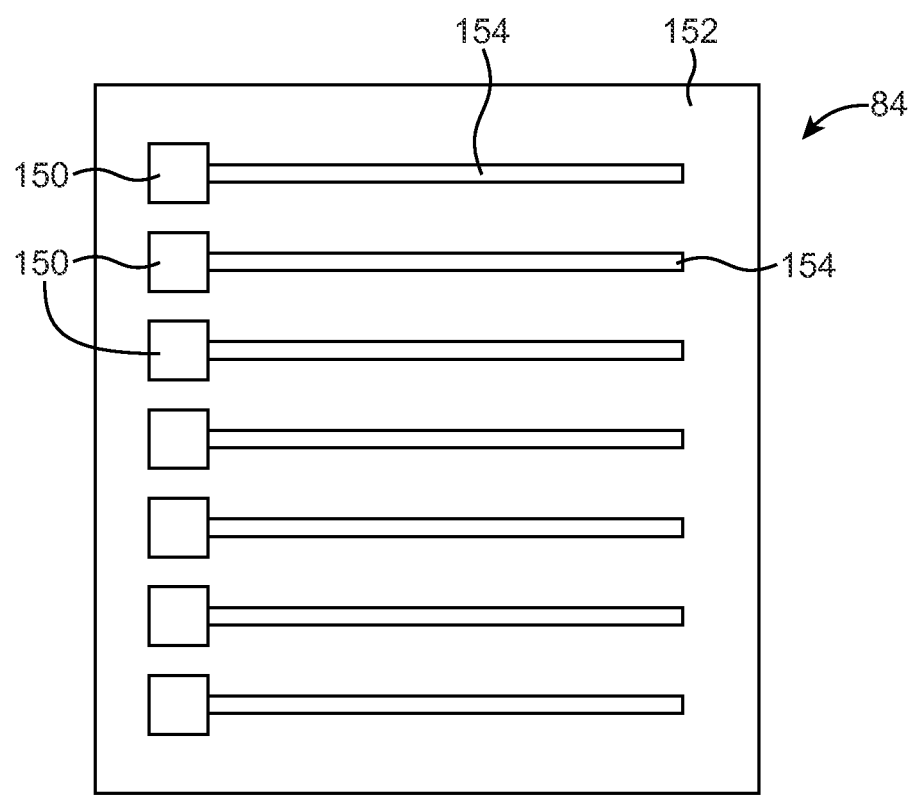
FIG. 11 is a diagram of illustrative backlight structures that include an array of optical waveguides such as optical fiber waveguides in accordance with an embodiment of the present invention.

FIG. 11 is a bottom view of illustrative backlight structures 84 showing how backlight structures 84 may be formed from optical waveguide structures such as optical fibers 154. Optical fibers 154 may be formed from material such as plastic or glass (as examples). Fibers 154 may be formed from a single material (e.g., a single glass or plastic material) or may have an inner portion (e.g., a higher index of refraction portion) that is coated with an outer portion (e.g., a lower index of refraction portion).

Fibers 154 may have a circular cross-sectional shape (as an example). If desired, waveguide structures with other cross-sectional shapes may be used in forming backlight structures 84. For example, optical waveguide structures for backlight structures 84 may have a square cross-sectional shape, a rectangular cross-sectional shape, an oval cross-sectional shape, a shape with curved edges, a shape with straight edges, a shape with a combination of curved and straight edges, or other suitable cross-sectional shapes. Optical fibers or other waveguides such as fibers 154 may be mounted to a support structure (e.g., a rigid or flexible glass or plastic substrate or a layer of resin) or may be mounted directly within housing structures 12 or other support structures.

Light sources such as one or more light-emitting diodes 150 may be used in providing backlight for display 14. As shown in FIG. 11, for example, an array of light-emitting diodes 150 may be used to launch light into each of multiple optical fibers 154.

Fibers 154 may be provided with light leakage promotion structures along their lengths to help scatter light out of fibers 154 through display 14. As an example, the outermost (uppermost) surface of fibers 154 may be roughened. The roughened texture on fibers 154 may promote light leakage from fibers 154 through display layers 181. If desired, a reflector may be provided under fibers 154 to help reflect stray light through display layers 81.

As shown in FIG. 11, backlight structures 84 may be provided with one or more optical films 152. Optical films 152 may be interposed between fibers 154 and display layers 81. Examples of layers that may be included in optical films 81 include brightness enhancing film layers, diffusing film layers, and compensating film layers (as examples).

Figure 12:
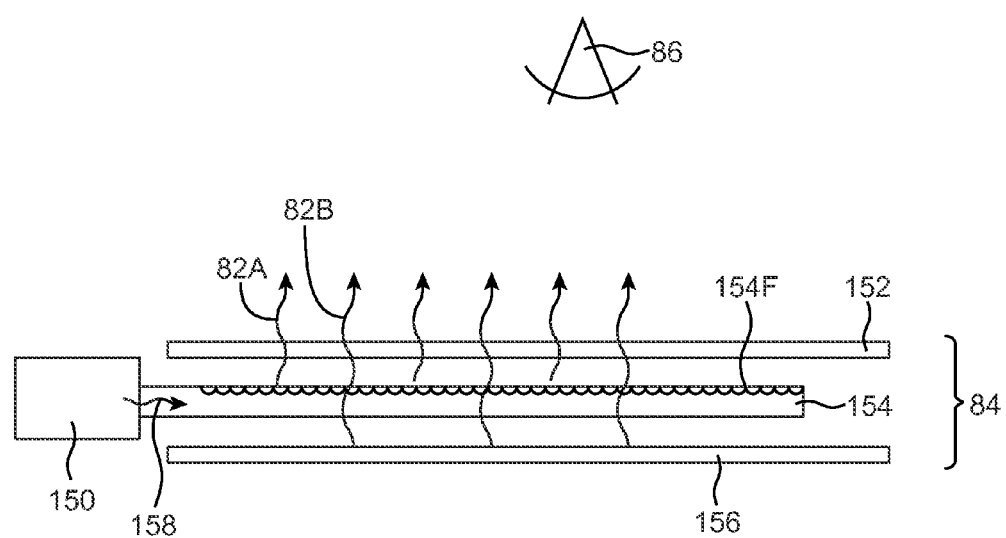
FIG. 12 is a cross-sectional side view of illustrative backlight structures that include an optical fiber in accordance with an embodiment of the present invention.

FIG. 12 is a cross-sectional view of backlight structures such as backlight structures 84 of FIG. 11. As shown in FIG. 12, light source 150 (e.g., a light-emitting diode) may emit light 158 into an adjacent end of optical fiber 154 (or other suitable optical waveguide structure). Optical fiber 154 may have light leakage promotion features such as features 154F (e.g., surface roughness on the upper surface of fiber 154). As light 158 propagates within fiber 154, some of light 158 leaks out of fiber 154 upwards and forms backlight 82A. Any light that escapes in the downwards direction (away from viewer 86) may be reflected back in the upwards direction by reflector 156 (e.g., a sheet of white plastic, metal, or other reflective substance). Optical films 152 (e.g., a diffuser, a brightness enhancement film, etc.) may be interposed between optical fiber 154 and display layers 81 in display 14.

Figure 13:
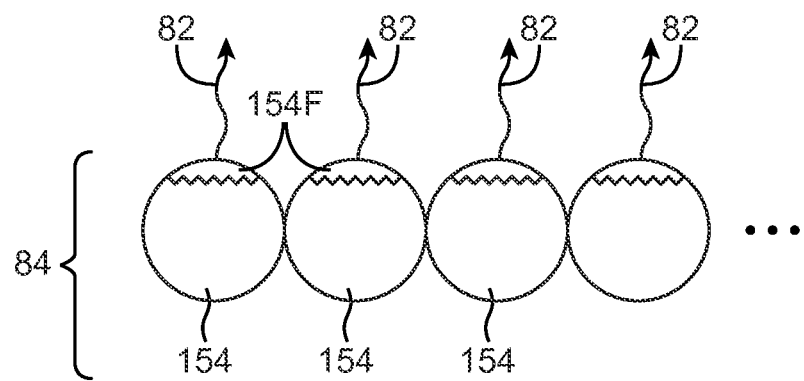
FIG. 13 is a cross-sectional end view of illustrative backlight structures that include optical fibers in accordance with an embodiment of the present invention.

FIG. 13 is a cross-sectional end view of backlight structures 84 that have been formed from a series of optical fibers 154. In the illustrative configuration of FIG. 13, each optical fiber 154 has been located immediately adjacent to another of optical fibers 154. If desired, optical fibers 154 may be spread out so that fewer fibers are needed in backlight structures 84. In configurations in which fibers 154 are spread out (and in configurations of the type shown in FIG. 13), diffuser layers may be used to ensure that backlight 82 is uniformly distributed over display 14.

Figure 14:
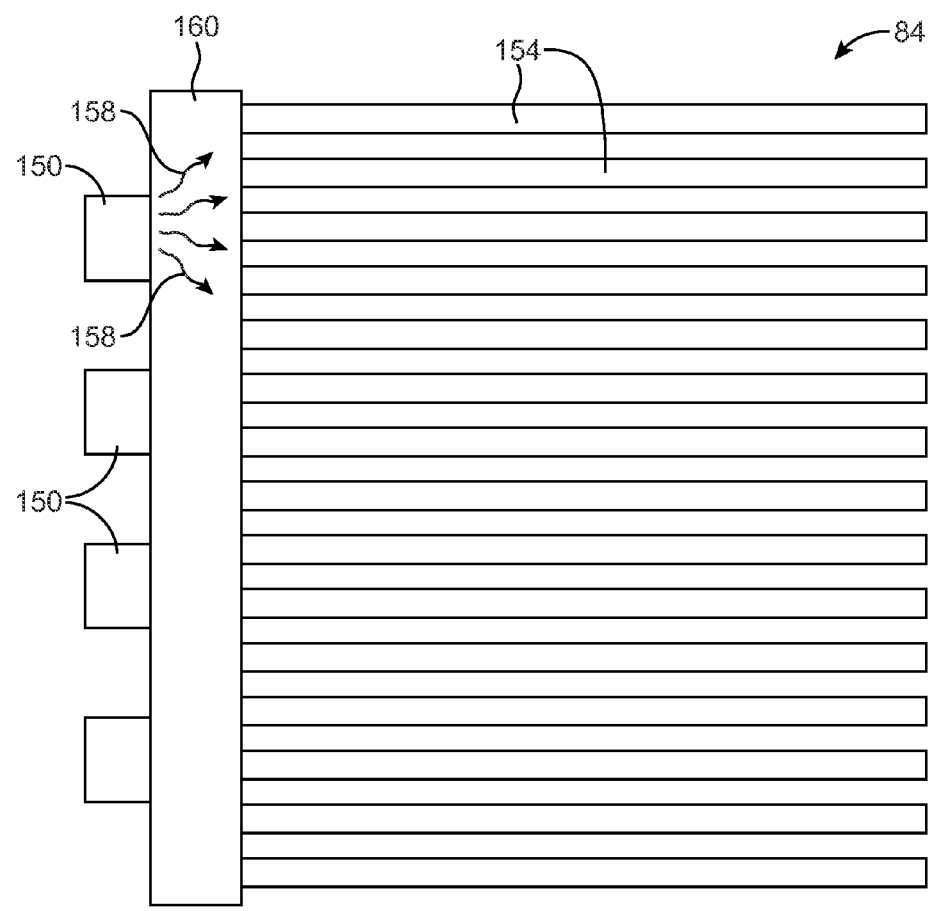
FIG. 14 is a diagram of illustrative backlight structures that include a structure for dispersing light that is interposed between an array of light-emitting diodes and an array of optical fibers in accordance with an embodiment of the present invention.

If desired, a diffusing and guiding structure such as optical diffusing and guiding structure 160 of FIG. 14 may be used to diffuse and guide light 158 that has been emitted from light-emitting diodes 150. Structure 160 may be formed from plastic, glass, or other transparent materials and may help distribute light 158 uniformly among multiple optical fibers 154 in backlight structures 84. With this type of arrangement, fewer light-emitting diodes 150 may be used in providing illumination for fibers 154 (i.e., a larger number of fibers 154 may be used than light-emitting diodes 150).

Figure 15:
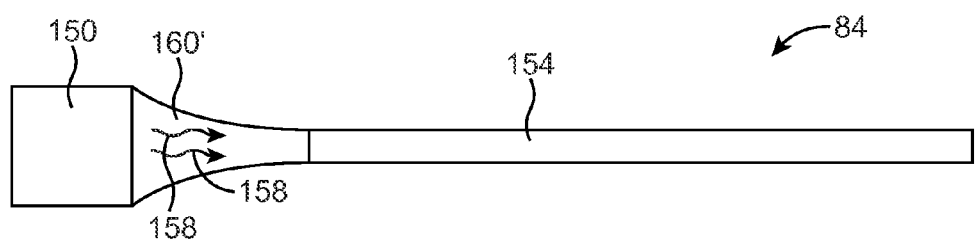
FIG. 15 is a diagram of an illustrative light source coupled to backlight structures formed from an optical fiber using a tapered waveguide structure in accordance with an embodiment of the present invention.

If desired, optical diffusing and guiding structures in backlight structures 84 such as structure 160 of FIG. 14 or other structures may be provided with tapered portions to help concentrate light into fibers 154. This type of arrangement is shown in FIG. 15. As shown in FIG. 15, light-emitting diode 150 may emit light 158 into structure 160'. Structures such as structure 160' of FIG. 15 may be provided between each of a plurality of light-emitting diodes and each respective one of a plurality of optical fibers 154, if desired.

Figure 16:
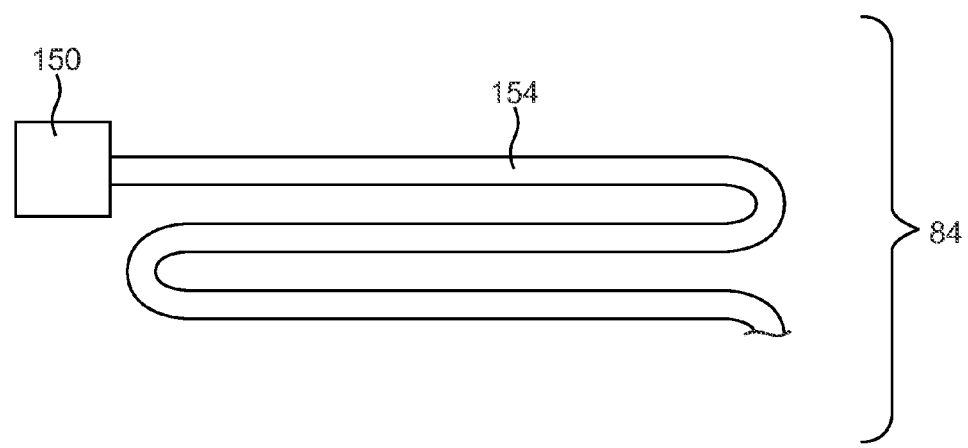
FIG. 16 is a diagram of illustrative backlight structures formed from an optical fiber that has been configured to follow a meandering path across the rear of a display accordance with an embodiment of the present invention.

As shown in FIG. 16, optical fiber 154 may be configured to have a meandering path in backlight structures 84. This type of arrangement may help distribute backlight over a relatively large area of display 14 without requiring the use of an overly large number of light-emitting diodes.

Figure 17:
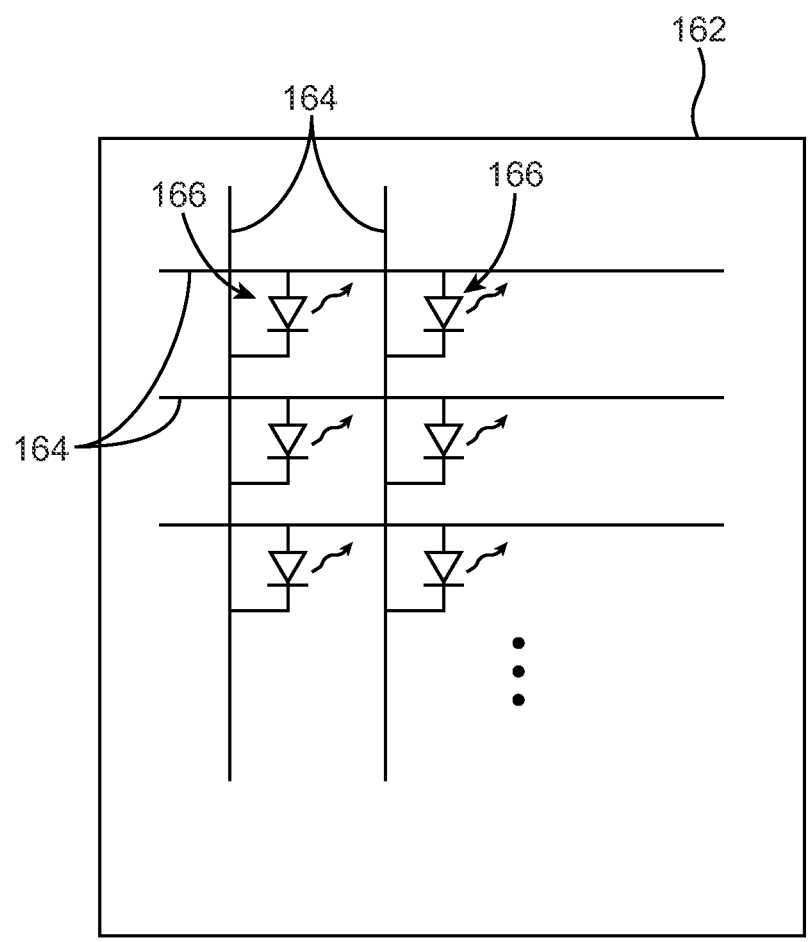
FIG. 17 is a diagram of an illustrative light-emitting diode array of the type that may be used in forming backlight structures for a display in accordance with an embodiment of the present invention.

If desired, a two-dimensional array of light-emitting diodes may be used in providing display 14 with backlight. An illustrative two-dimensional light-emitting diode array is shown in FIG. 17. As shown in FIG. 17, light-emitting diode array 162 may include signal lines such as control lines 164 that control an array of light-emitting diodes 166. Light emitting diodes 166 may be organized in an array having multiple rows and multiple columns. There may be any suitable number or rows and columns of light-emitting diodes 166 in array 162 (e.g., ten or more rows and ten or more columns, 100 or more rows and 100 or more columns, 1000 or more rows and/or columns, etc.). Control lines 164 may run vertically and horizontally across array 162. To conserve control circuit resources, it may be desirable to electrically short some of lines 164 together (e.g., so that multiple columns and/or rows of light-emitting diodes 166 may be controlled together). If desired, all of light-emitting diodes 166 may be controlled together (e.g., by configuring control lines 164 to power all of light-emitting diodes 166 at the same time using a common direct current or alternating current power signal). Light-emitting diodes 166 or relatively small sections of light-emitting diodes 166 may also be individually controlled (e.g., in configurations in which it is desirable to implement a localized dimming scheme for increasing the contrast ratio for display 14).

Light-emitting diodes 166 may be white-light diodes or other monochromatic diodes (as an example). Each light-emitting diode 166 may be implemented using a separate surface-mount technology (SMT) packaged light-emitting diode component (e.g., a component that has solderable leads) or may be implemented using thin-film structures. For example, array 162 may be implemented by mounting rows and columns of SMT light-emitting diodes to a substrate such as a rigid or flexible printed circuit board, a layer of glass, or other suitable substrate. Light-emitting diode array 162 may also be implemented by depositing and patterning thin-film (e.g., polysilicon and/or amorphous silicon) light-emitting diode structures on a glass substrate, a rigid or flexible polymer substrate, or other suitable substrate. Light-emitting diode array 162 may, if desired, be formed from rows and columns of organic light-emitting diodes. Each organic light-emitting diode may include an organic emissive layer. An array of organic light-emitting diodes may be formed on a polymer substrate such as a polyimide substrate or a substrate formed from glass or other materials. The substrate on which the organic light-emitting diodes are formed may be flexible or may be rigid. Multiple layers of material may also be used in forming a substrate for light-emitting diodes 166, if desired.

Figure 18:
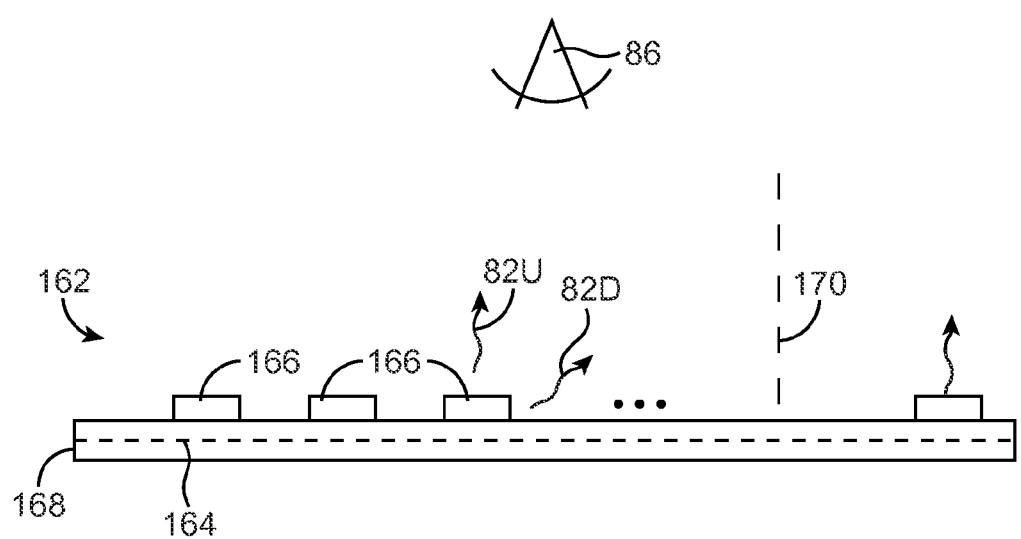
FIG. 18 is a cross-sectional side view of an illustrative light-emitting diode array of the type that may be used in forming backlight structures for a display in accordance with an embodiment of the present invention.

FIG. 18 is a side view of an illustrative array of light-emitting diodes 116. As shown in FIG. 18, light-emitting diodes 166 may be formed on substrate 168. Substrate 168 may be formed from a layer of polyimide or other polymer (plastic), from a layer of glass, from a layer of ceramic, from other suitable substrate materials, or from a combination of two or more of these materials. One or more layers of patterned interconnects may be formed in substrate 168, as illustrated by conductive lines 164 of FIG. 18. Lines 164 may be used for controlling light-emitting diodes 166, as described in connection with FIG. 17.

As shown in FIG. 18, light-emitting diodes 166 may be configured to emit backlight such as backlight 82D that travels in off-axis directions (i.e., directions that are angled with respect to surface normal 170, which is perpendicular to the surface of substrate 168 and display 14). If desired, light-emitting diodes 166 may be vertically mounted light-emitting diodes that are configured to emit backlight such as backlight 82U in a direction that is parallel to surface normal 170 (i.e., in a vertical direction that is parallel to an axis such as axis 170 that is perpendicular to the surface of substrate 168). Vertically mounted light-emitting diodes or other light-emitting diodes 166 that are configured to emit backlight vertically may help enhance backlight brightness.

An array of light-emitting diodes 166 such as array 162 of FIGS. 17 and 18 (e.g., an organic light-emitting diode array) may be used as to form backlight structures 84 in displays such as displays 14 of FIGS. 8, 9, and 10 (as examples).

In a display configuration of the type shown in FIG. 8, light-emitting diode array 162 may be mounted under polarizer 74 to serve as backlight structures 84 of FIG. 8. Optical films (e.g., diffuser films, brightness enhancement films, etc.) may be interposed between light-emitting diode array 162 and polarizer 74 or may be omitted. Polarizer 74 and, if desired, light-emitting diode array 162 may be formed from flexible materials. Substrate 94 of thin-film transistor layer 92 may be used to provide structural support for light-emitting diode array 162, if desired.

In a configuration of the type shown in FIG. 9, light-emitting diode array 162 may also be mounted under polarizer 74 to serve as backlight structures 84. As in the arrangement of FIG. 8, optical films (e.g., diffuser films, brightness enhancement films, etc.) may be interposed between light-emitting diode array 162 and polarizer 74 of FIG. 9 or may be omitted. Polarizer 74 may be formed from a flexible material (e.g., a sheet of polymer). Accordingly, it may be desirable to support polarizer 74 with a rigid structure. The rigid structure may be formed by a rigid planar member that is mounted under light-emitting diode array 162 and/or that forms part of light-emitting diode array 162. For example, light-emitting diode array 162 for backlight structures 84 of FIG. 9 may be formed from a layer of glass (i.e., a glass substrate) or a rigid layer of plastic or other materials (i.e., a rigid plastic substrate or a rigid substrate of other materials). A flexible light-emitting diode array may be used, if desired. The flexible light-emitting diode may be supported by an underlying rigid planar support structure (e.g., a rigid layer of glass, plastic, ceramic, or metal, part of housing 12, or other suitable support structures).

In a configuration of the type shown in FIG. 9, color filter layer 80 may, if desired, be formed from a rigid layer of glass, plastic, or other material. In this type of arrangement, color filter layer 80 may be used to provide rigidity for polarizer layer 74 and a flexible organic light-emitting diode array or other light-emitting diode array 162. If desired, light-emitting diode array 162 may be formed from a rigid material such as glass, plastic, or ceramic or may be formed from a flexible substrate that is attached to a planar rigid support structure formed from glass, plastic, ceramic, or other suitable support structure materials, a portion of housing 12, etc.

Figure 19:
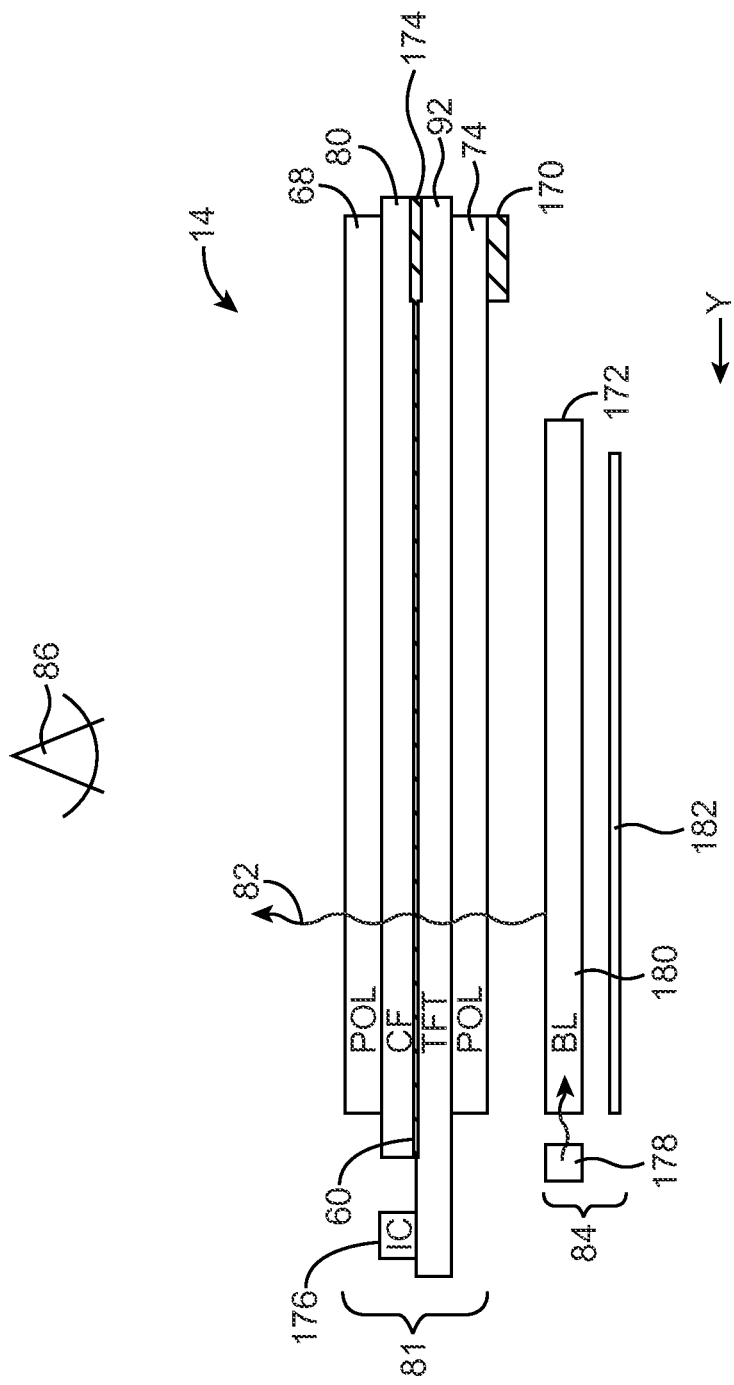
FIG. 19 is a cross-sectional side view of a display having an opaque masking layer on the underside of a layer of polarizing material in accordance with an embodiment of the present invention.

FIG. 19 is a cross-sectional side view of an illustrative arrangement that may be used for display 14 in which an opaque masking layer such as opaque masking layer 170 has been formed on the underside of the periphery of lower polarizer layer 74. As shown in FIG. 19, display 14 may include liquid crystal layer 60. Liquid crystal layer 60 may be sandwiched between thin-film transistor layer 92 and color filter layer 80. Driver integrated circuit 176 may be mounted on a ledge portion of thin-film transistor layer 92. A layer of plastic, black ink, or other opaque masking material 174 may be formed between color filter layer 80 and thin-film transistor layer 92 in peripheral border regions of display 14 (i.e., in an inactive border region that does not contain any active display pixels 40). Color filter layer 80, liquid crystal layer 60, and thin-film transistor layer 92 may be interposed between upper polarizer 68 and lower polarizer 74. Backlight structures 84 may include a light guide plate such as light guide plate 180 and a light-emitting diode array or other light source 178. Light source 178 (e.g., a light-emitting diode light source) may emit light into light guide plate 180 to serve as backlight 82. Reflector 182 in backlight structures 84 may serve to reflect light through display layers 81 to viewer 86.

With this type of arrangement, the edges of light guide plate 180 such as illustrative right-hand edge in FIG. 19 may be bright due to reflected light from light-source 178. To prevent bright edges 172 from being visible from the exterior of device 10, opaque masking layer 170 may be provided on the lower surface of polarizer 74 in a shape that overlaps edges 172. Opaque masking layer 170 may be formed in a peripheral region (e.g., an inactive border region) surrounding the edges of display 14 (e.g., layer 170 may be patterned to cover a rectangular ring-shaped area on the lower surface of polarizer 74). Opaque masking layer 170 and layer 174 may be formed from black ink, opaque plastic, or other opaque materials. Due to the presence of masking layer 170, edge 172 may be located in a region of device 10 that is relatively far from the edge of layer 92 and the edge of polarizer layer 74, thereby creating additional room within device 10 for mounting other components.

Figure 20:
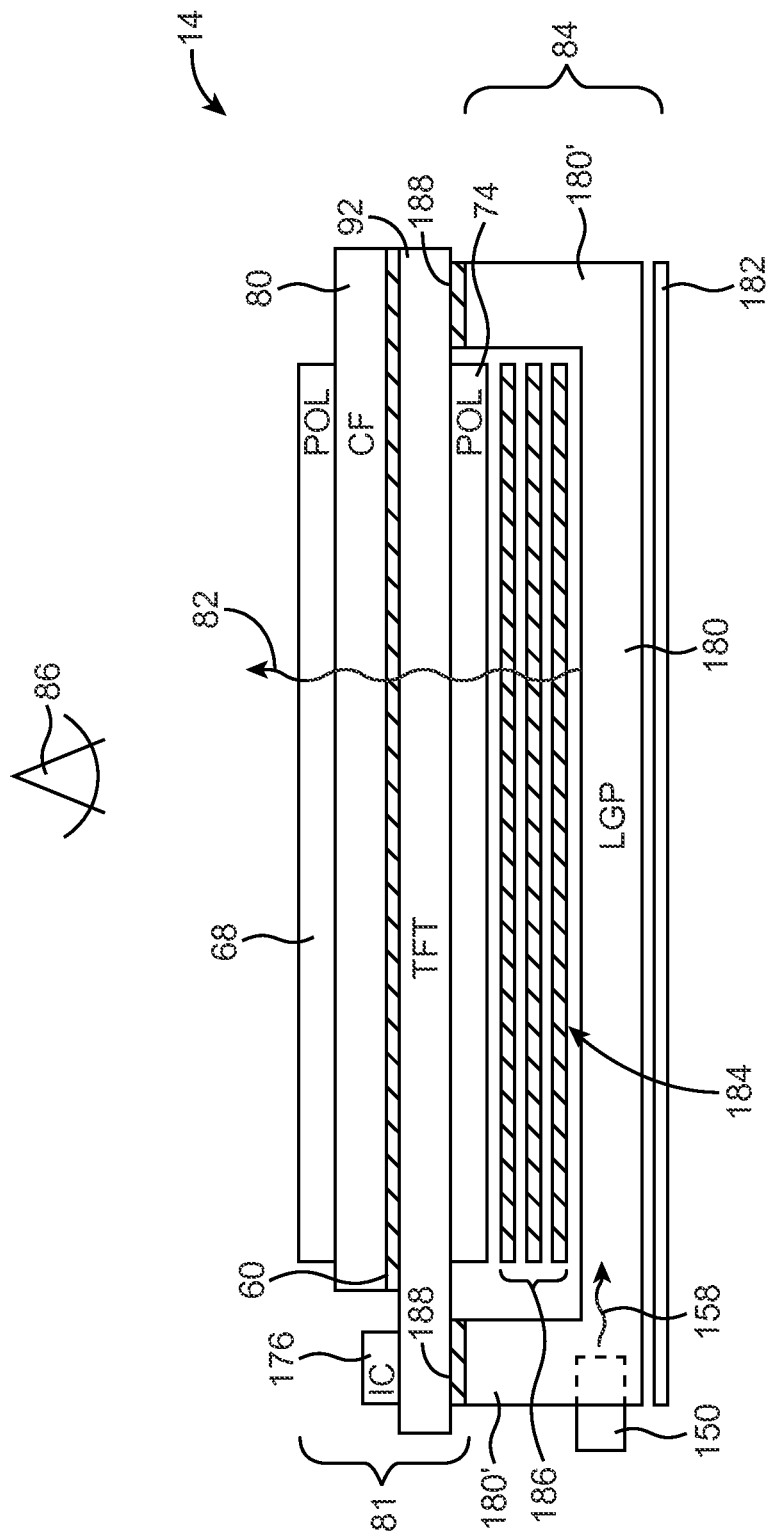
FIG. 20 is a cross-sectional side view of an illustrative display having a backlight light guide structure with a recessed portion for receiving optical films in accordance with an embodiment of the present invention.

As shown in FIG. 20, light-guide structures 180 may be configured to form a recess such as rectangular pocket 184 under display layers 181. Light guide structures 180 may be formed from a plastic such as acrylic, glass, or other transparent material. Recess 184 may have a depth that is sufficient to receive optical films 186. Optical films 186 may have a rectangular outline. Recess 184 may have a rectangular outline that is sufficiently large to receive optical films 186. Optical films 186 may include films such as a diffusing layer, a brightness enhancing film, and other optical material layers. Light guide structures 180 (sometimes referred to as a planar light guide member or light guide plate) may have protruding sidewalls such as sidewall portions 180' that protrude upwards around the four edges at the periphery of display 14 and thereby define four sides for recess 184. If desired, recess 184 may be sufficiently large to accommodate some of display layers 181 such as polarizer layer 74.

Light 158 may be emitted from light source 150 into an edge or other surface of backlight light guide structures 180. Light 158 may leak upwards out of upper surface of structure 180 to serve as backlight 82. Reflector 182 may help reflect light 158 that has leaked downwards back in an upwards direction to serve as additional backlight 82. Light guide plate 180 may serve as the main or exclusive structural element in backlight structures 84. For example, light guide plate 180 may provide support for optical films 186 and/or reflector 182. Reflector 182 may, as an example, be formed from a layer of metal that is deposited as a coating on light guide plate 180 or may be formed from a material that is attached to light guide plate 180.

Adhesive such as adhesive 188 (e.g., epoxy) may be used to attach light-guide structure 180 of backlight structures 84 to display layers 81 (e.g., by attaching light-guide structure sidewall portions 180' to the lower surface of thin-film transistor layer 92). If desired, light guide structures with a rectangular-pocket-shaped recess such as recess 184 of FIG. 20 may be used in backlight structures such as backlight structures 84 of FIGS. 9 and 10 (e.g., to provide backlight to a inverted-type display in which the color filter layer is interposed between the thin-film transistor structures and the backlight).

Backlight light guide structures such as structures 180 of FIG. 20 may be provided with alignment features to help laterally align optical films 186. The alignment features may be implemented in the form of protrusions on structures 180 or other suitable alignment features that are configured to mate with mating alignment features on optical films 186.

Figure 21:
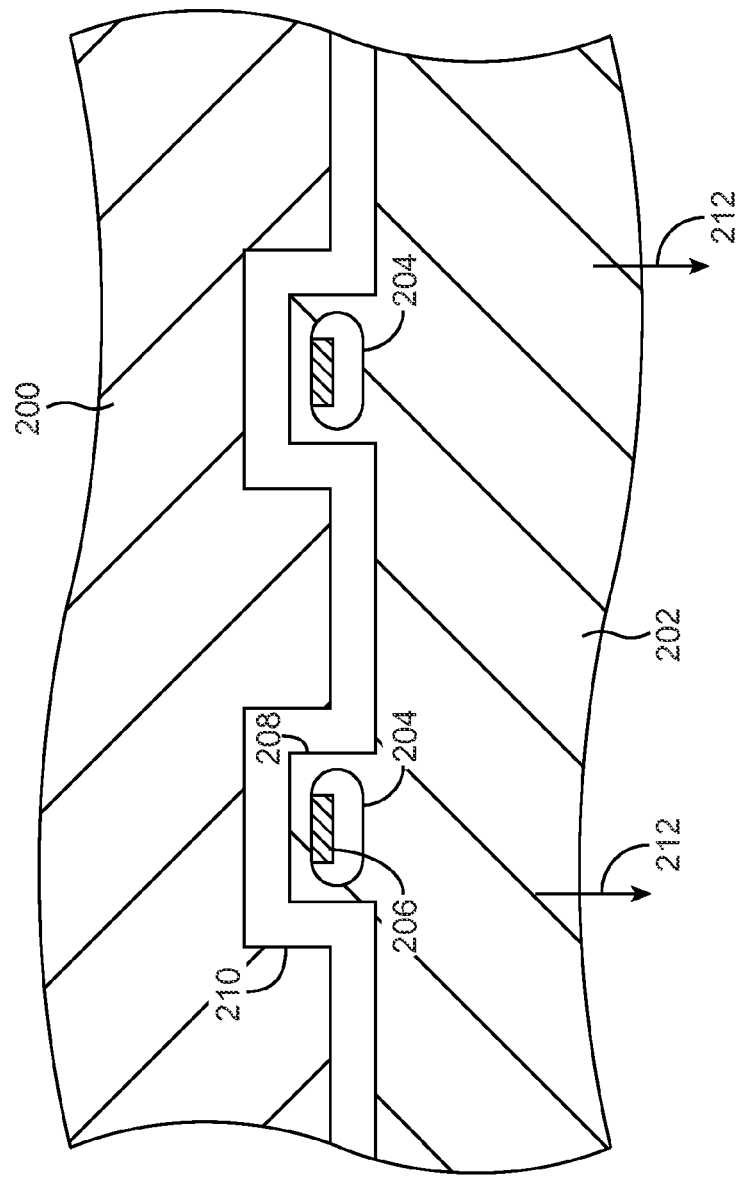
FIG. 21 is a diagram of a portion of a conventional display in a housing with registration pins that mate with holes in backlight optical films.

A conventional arrangement for aligning optical films in a computer with a backlit display is shown in FIG. 21. As shown in FIG. 21, optical films 202 are provided with tabs 208 that are received within corresponding notches in aluminum computer housing 200. Aluminum pins 206 are formed as part of aluminum computer housing 200 and are received within openings 204 in optical films 202. Under the influence of gravity, optical films 202 are pulled downwards in direction 212 and are held in place by the interaction between pins 206 and holes 204. Optical films 202 are formed from plastic, whereas housing 200 is formed from aluminum. There is therefore a non-negligible mismatch in the coefficients of thermal expansion between housing 200 and optical films 202. As a result, the gaps that are formed between tabs 208 and notches 210 tend to be large to accommodate thermal expansion mismatch.

Light guide structures such as light guide plate 180 of FIG. 20 may be formed from a material such as plastic and may therefore be characterized by a coefficient of thermal expansion that is comparable to that of plastic (polymer) optical films 186. By providing alignment features on light guide plate 180 and using light guide plate 180 as a structural element into which optical films 186 are assembled to form backlight structures 84 as described in connection with FIG. 20, gap sizes can be reduced and alignment tolerances can be enhanced.

Figure 22:
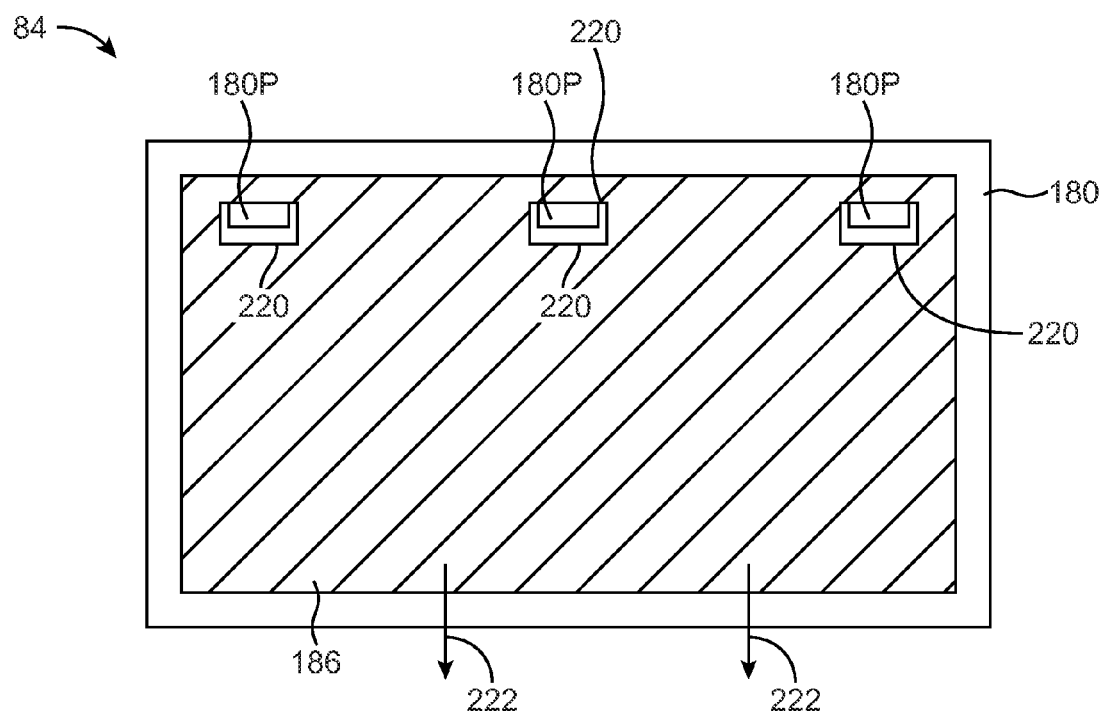
FIG. 22 is a diagram of a display having backlight structures with alignment features such as holes that mate with corresponding alignment features such as protrusions on a backlight light guide structure in accordance with an embodiment of the present invention.

An illustrative arrangement that may be used for backlight structures 84 in a configuration in which alignment features for backlight structure optical films are formed on light guide plate 180 is shown in FIG. 22. As shown in FIG. 22, backlight structures 84 may include a light guide plate or other light guide structures 180. Light guide structures 180 may be formed from a rectangular plate without sidewalls (i.e., without a recessed portion) or may be formed from a rectangular plate with protruding sidewall portions such as sidewall portions 180' of FIG. 20.

Light guide structures 180 may be provided with alignment features that mate with corresponding alignment features on optical films 186. For example, light guide structures 180 may be provided with protrusions 180P. Protrusions 180P may be formed from rectangular pins or other protruding structures. Optical films 186 may be provided with mating openings such as holes 220. When display 14 is held in a particular orientation in a laptop computer or compute monitor or in other suitable device arrangements, optical films 186 will be pulled in direction 222 under the influence of gravity. As a result, the edges of holes 220 will bear against corresponding edges of protruding portions 180P of light guide structures 180, aligning optical films 186 within backlight structures 84.

Figure 23:
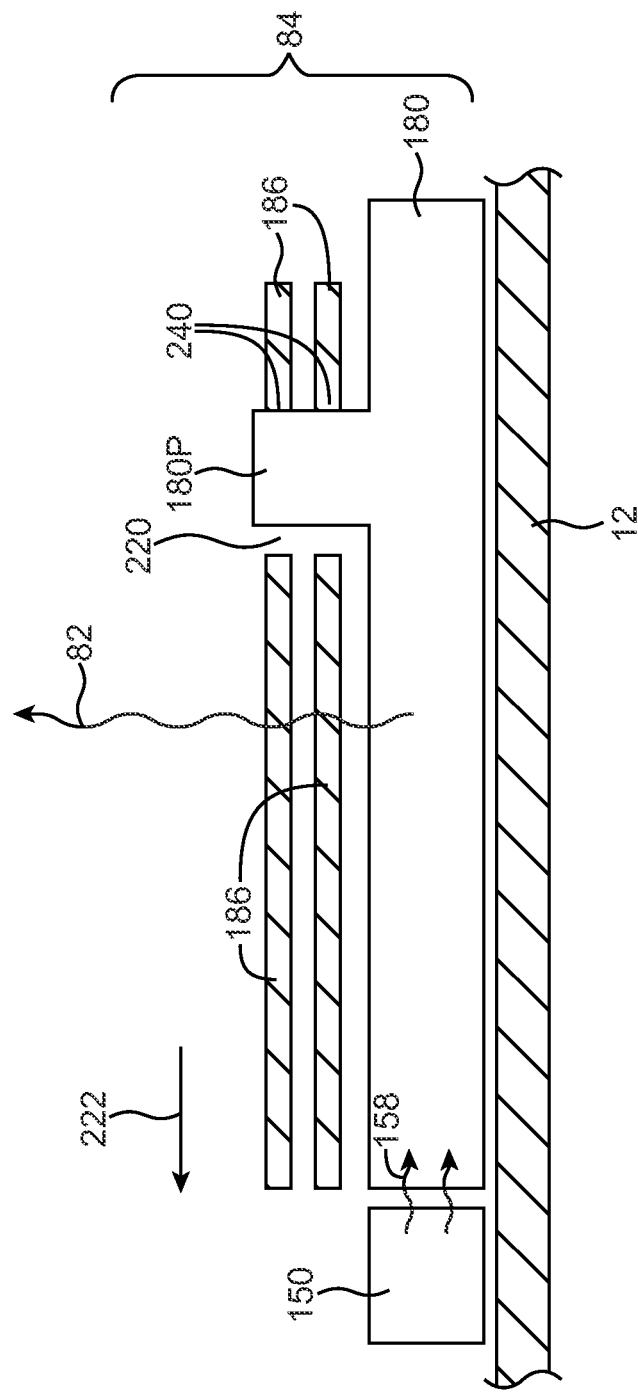
FIG. 23 is a cross-sectional side view of an illustrative display in which optical films have been aligned with a light guide structure using protrusions on the light guide structure in accordance with an embodiment of the present invention.

FIG. 23 is a cross-sectional view of backlight structures such as backlight structures 84 of FIG. 22 that have been mounted within electronic device housing 12. In the illustrative configuration of FIG. 23, gravity is causing optical films 186 to move in direction 222. This causes upper edge 240 of opening 220 in optical films 186 to register against the adjacent edge of protruding portion 180P of light guide plate 180.

Figure 24:
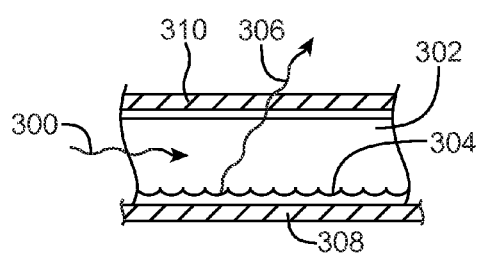
FIG. 24 is a cross-sectional side view of a conventional backlight for a display.

A conventional light guide plate is shown in FIG. 24. Light 300 from a light-emitting diode array enters the edge of light guide plate 302. Textured lower surface 304 helps scatter light 300 so that some of light 300 leaks vertically upward from light guide plate 302 and, after passing through optical films 310 such as diffuser and brightness enhancing films, serves as backlight 306. Reflector 308 reflects light that has leaked downwards back upwards to serve as additional backlight 306.

Figure 25:
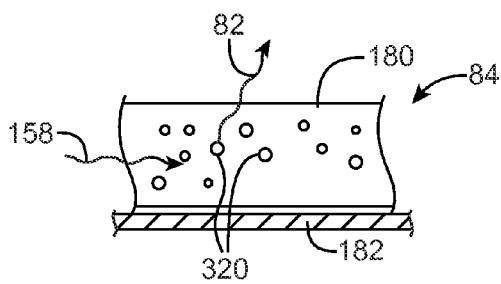
FIG. 25 is a cross-sectional side view of a display backlight light guide structure having embedded scattering structures in accordance with an embodiment of the present invention.

If desired, light scattering features may be implemented within light guide structures such as a glass or plastic light guide plate. If light is sufficiently well dispersed (diffused) by the light scattering structures within the light guide plate, diffuser layers and other optical films may be omitted from backlight structures 84. This type of arrangement is shown in FIG. 25. As shown in FIG. 25, backlight structures 84 include a light guide structure such as light guide plate 180 that includes internal structures 320. Internal structures 320 may be formed from bubbles filled with air, particles formed from materials with an index of refraction that is greater than or less than the index of refraction of light guide plate 180, or particles or voids with other properties that scatter light 158 from a light source such as a light-emitting diode light source. The inclusion of bubbles, particles, or other structures within the interior of light guide plate 180 may reduce or eliminate the need for diffusing films (as an example). Reflector 182 may be used to improve backlight efficiency.

Figure 26:
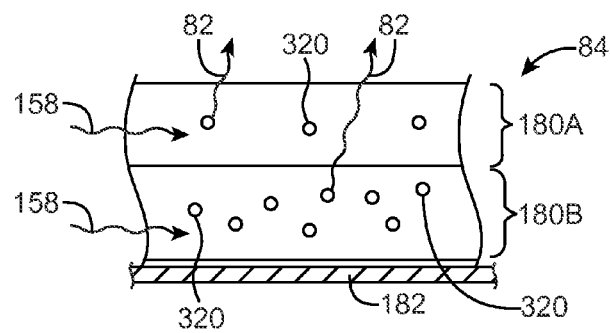
FIG. 26 is a cross-sectional side view of a display backlight light guide structure having multiple layers of embedded light scattering structures in accordance with an embodiment of the present invention.

In the illustrative configuration of FIG. 26, light guide structures 84 have been formed from a multilayer light guide plate that includes lower light guide plate layer 180B (having a first type of bubbles or other internal structures 320) and an upper light guide plate layer 108A (having a second type of bubbles or other internal structures 320). There may be three or more layers in light guide plate 180 if desired. Each layer may have a different type of internal structures (e.g., a different density of internal structures, internal structures of different sizes, shapes, internal structures formed from different materials, etc.). Reflector 182 may be used to improve backlight efficiency.

Figure 27:
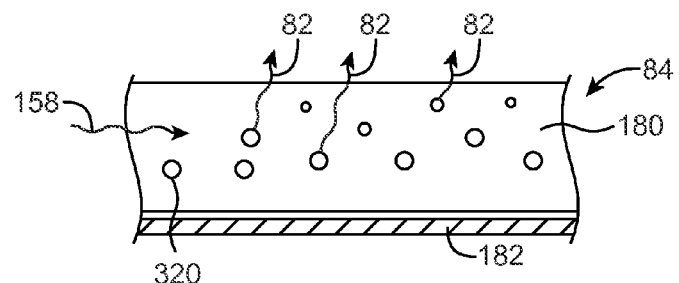
FIG. 27 is a cross-sectional side view of a display backlight light guide structure having embedded scattering structures distributed unevenly throughout the light guide structure in accordance with an embodiment of the present invention.

In the illustrative configuration of FIG. 27, light guide plate 180 of backlight structures 84 has been provided with bubbles or other internal structures 320 with sizes, shapes, and/or materials properties that change smoothly (e.g., structure types that vary following a linear or curved gradient). As an example, the properties of internal structures 320 may vary as a function of vertical distance within light guide plate 180. Backlight efficiency may be enhanced using reflector 182, if desired.

Figure 28:
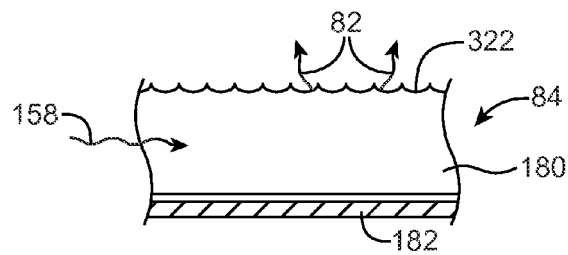
FIG. 28 is a cross-sectional side view of a display backlight light guide structure having a textured surface light-leakage promotion structure in accordance with an embodiment of the present invention.

Another illustrative arrangement for backlight structures 84 is shown in FIG. 28. In the configuration of FIG. 28, light guide plate 180 has been provided with a textured surface or other surface treatment on the upper surface of light guide plate 180 that promotes light leakage. The inclusion of textured surface 322 causes light 158 to exit light guide plate 180 to serve as backlight 82. Reflector 182 may be used to enhance backlight efficiency for backlight structures 84.

The foregoing is merely illustrative of the principles of this invention and various modifications can be made by those skilled in the art without departing from the scope and spirit of the invention.

What is claimed is:

1. A display, comprising:
    an outer display layer;
    an inner display layer;
    a two-dimensional light-emitting diode array that produces display backlight, wherein the light-emitting diode array comprises a first substrate and a plurality of vertical and horizontal control lines on the first substrate that control the operation of each light-emitting diode in the array individually;
    a layer of liquid crystal material between the outer display layer and the inner display layer, wherein the outer display layer comprises a second substrate and comprises thin-film transistors, wherein the inner display layer comprises a polarizer layer that is interposed between the layer of liquid crystal material and the two-dimensional light-emitting diode array; and
    a sealant formed on a surface of the polarizer layer, wherein the sealant contains the liquid crystal material on the surface of the polarizer layer and wherein the polarizer layer is mounted directly to the first substrate.

2. The display defined in claim 1 further comprising a layer of color filter elements on the second substrate, wherein the thin-film transistors are interposed between the color filter elements and the second substrate.

3. The display defined in claim 1 wherein the two-dimensional array of light-emitting diodes comprises an array of vertically mounted light-emitting diodes mounted on the first substrate in rows and columns.

4. The display defined in claim 1 wherein the array of light-emitting diodes comprises a two-dimensional array of organic light-emitting diodes.

5. The display defined in claim 1 wherein the light-emitting diode array comprises an array of white-light-emitting diodes configured to emit white light.

6. The display defined in claim 1 wherein the light-emitting diode array comprises a flexible light-emitting diode array.

7. The display defined in claim 6 wherein the first substrate comprises a flexible polyimide substrate and wherein the flexible light-emitting diode array comprises an array of light-emitting diodes mounted on the flexible polyimide substrate.

8. The display defined in claim 1 wherein the polarizer layer comprises a flexible polarizer layer.

9. The display defined in claim 8 wherein the first substrate comprises a rigid substrate and wherein the light-emitting diode array comprises an array of light-emitting diodes mounted on the rigid substrate, wherein the rigid substrate supports the flexible polarizer layer.

10. The display defined in claim 1 wherein the control lines are configured to operate the light-emitting diodes in a localized dimming scheme.

11. The display defined in claim 1 wherein the first substrate comprises a rigid printed circuit board and wherein the light-emitting diode array comprises an array of SMT light-emitting diodes mounted on the rigid printed circuit board.

12. The display defined in claim 1 wherein the first substrate comprises a glass substrate and wherein the light-emitting diode array comprises a pattern of thin-film light-emitting diode structures on the glass substrate.

13. The display defined in claim 1 further comprising an additional polarizer layer, wherein the second substrate is interposed between the additional polarizer layer and the thin-film transistors.

* * * * *